United States Patent
Dallal et al.

(10) Patent No.: US 12,375,941 B2
(45) Date of Patent: Jul. 29, 2025

(54) RANDOM ACCESS CHANNEL OCCASIONS ASSOCIATED WITH A RELAY

(71) Applicant: QUALCOMM Incorporated, San Diego, CA (US)

(72) Inventors: Yehonatan Dallal, Kfar Saba (IL); Idan Michael Horn, Hod Hasharon (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 509 days.

(21) Appl. No.: 17/808,718

(22) Filed: Jun. 24, 2022

(65) Prior Publication Data

US 2023/0422306 A1 Dec. 28, 2023

(51) Int. Cl.
*H04W 74/0833* (2024.01)
*H04W 16/26* (2009.01)

(52) U.S. Cl.
CPC ....... *H04W 74/0833* (2013.01); *H04W 16/26* (2013.01)

(58) Field of Classification Search
None
See application file for complete search history.

(56) References Cited

U.S. PATENT DOCUMENTS

| | | | | |
|---|---|---|---|---|
| 2021/0075474 | A1* | 3/2021 | Raghavan | H04B 7/0417 |
| 2023/0130003 | A1* | 4/2023 | Ali | H04W 24/02 370/329 |
| 2024/0298190 | A1* | 9/2024 | Choi | H04B 7/15507 |
| 2024/0322882 | A1* | 9/2024 | Rom | H04L 5/0057 |
| 2024/0364414 | A1* | 10/2024 | Wanuga | H04L 5/0094 |

* cited by examiner

*Primary Examiner* — Saumit Shah
(74) *Attorney, Agent, or Firm* — Harrity & Harrity LLP/Qualcomm Incorporated

(57) ABSTRACT

Various aspects of the present disclosure generally relate to wireless communication. In some aspects, a relay may receive, from a network node and via a network node beam, a network node synchronization signal block (SSB). The relay may transmit, to a user equipment (UE) and via a relay beam, a relay SSB that is based at least in part on the network node SSB. The relay may receive, from the UE and via the relay beam, a preamble during a first random access channel (RACH) occasion that is associated with the relay SSB. The relay may transmit, to the network node and via the network node beam, the preamble during a second RACH occasion that is associated with the network node SSB. Numerous other aspects are described.

30 Claims, 11 Drawing Sheets

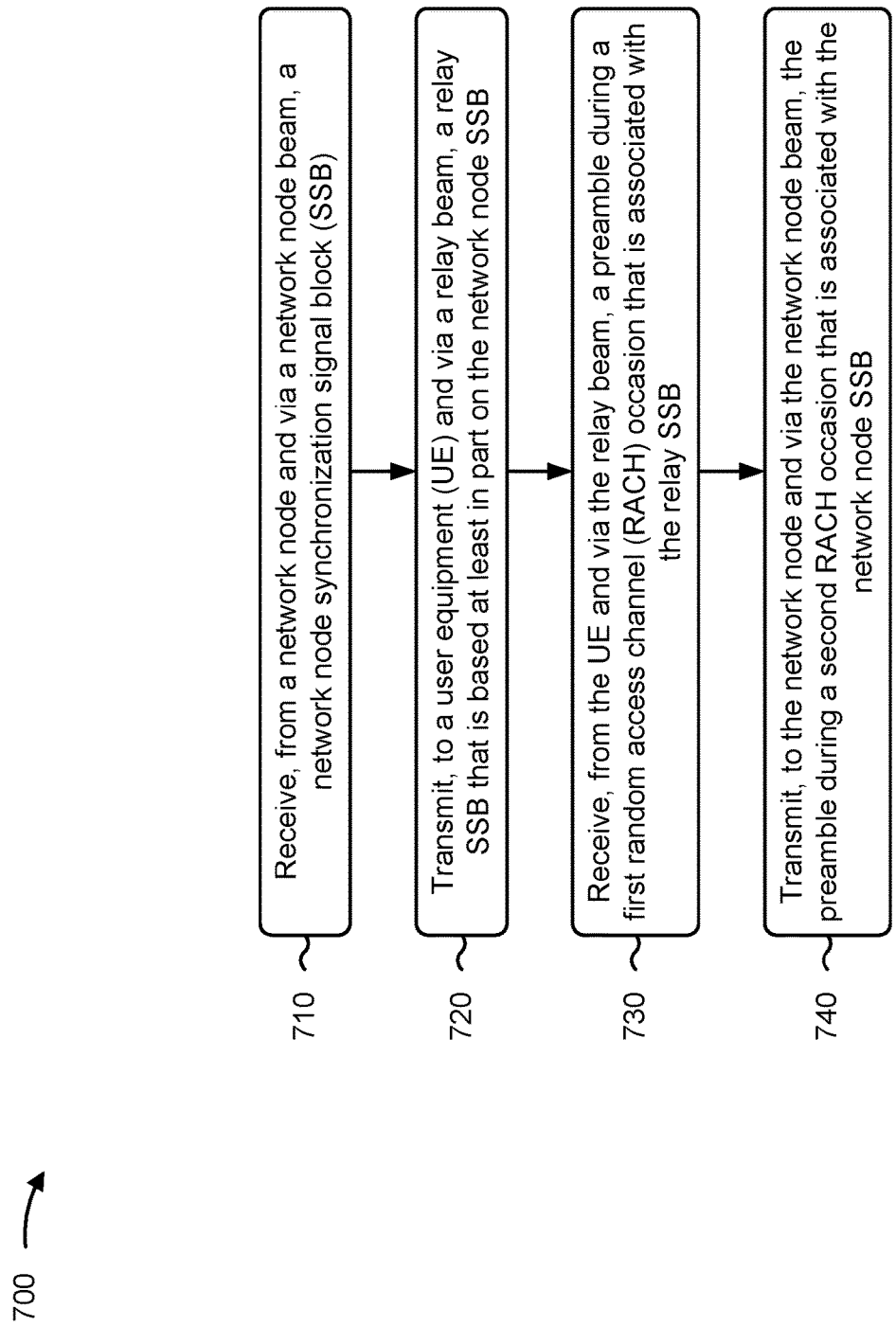

RANDOM ACCESS CHANNEL OCCASIONS ASSOCIATED WITH A RELAY

FIELD OF THE DISCLOSURE

Aspects of the present disclosure generally relate to wireless communication and to techniques and apparatuses for random access channel (RACH) occasions associated with a relay.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some implementations, an apparatus for wireless communication at a relay includes a memory and one or more processors, coupled to the memory, configured to: receive, from a network node and via a network node beam, a network node synchronization signal block (SSB); transmit, to a user equipment (UE) and via a relay beam, a relay SSB that is based at least in part on the network node SSB; receive, from the UE and via the relay beam, a preamble during a first random access channel (RACH) occasion that is associated with the relay SSB; and transmit, to the network node and via the network node beam, the preamble during a second RACH occasion that is associated with the network node SSB.

In some implementations, an apparatus for wireless communication at a network node includes a memory and one or more processors, coupled to the memory, configured to: transmit, to a relay and via a network node beam, a network node SSB, wherein a relay SSB is derived based at least in part on the network node SSB and is transmitted to a UE via a relay beam; and receive, from the relay and via the network node beam, a preamble during a second RACH occasion that is associated with the network node SSB, wherein the preamble is received by the relay via the relay beam during a first RACH occasion that is associated with the relay SSB.

In some implementations, a method of wireless communication performed by a relay includes receiving, from a network node and via a network node beam, a network node SSB; transmitting, to a UE and via a relay beam, a relay SSB that is based at least in part on the network node SSB; receiving, from the UE and via the relay beam, a preamble during a first RACH occasion that is associated with the relay SSB; and transmitting, to the network node and via the network node beam, the preamble during a second RACH occasion that is associated with the network node SSB.

In some implementations, a method of wireless communication performed by a network node includes transmitting, to a relay and via a network node beam, a network node SSB, wherein a relay SSB is derived based at least in part on the network node SSB and is transmitted to a UE via a relay beam; and receiving, from the relay and via the network node beam, a preamble during a second RACH occasion that is associated with the network node SSB, wherein the preamble is received by the relay via the relay beam during a first RACH occasion that is associated with the relay SSB.

In some implementations, a non-transitory computer-readable medium storing a set of instructions for wireless communication includes one or more instructions that, when executed by one or more processors of a relay, cause the relay to: receive, from a network node and via a network node beam, a network node SSB; transmit, to a UE and via a relay beam, a relay SSB that is based at least in part on the network node SSB; receive, from the UE and via the relay beam, a preamble during a first RACH occasion that is associated with the relay SSB; and transmit, to the network node and via the network node beam, the preamble during a second RACH occasion that is associated with the network node SSB.

In some implementations, a non-transitory computer-readable medium storing a set of instructions for wireless communication includes one or more instructions that, when executed by one or more processors of a network node, cause the network node to: transmit, to a relay and via a network node beam, a network node SSB, wherein a relay SSB is derived based at least in part on the network node SSB and is transmitted to a UE via a relay beam; and receive, from the relay and via the network node beam, a preamble during a second RACH occasion that is associated with the network node SSB, wherein the preamble is received by the relay via the relay beam during a first RACH occasion that is associated with the relay SSB.

In some implementations, an apparatus for wireless communication includes means for receiving, from a network node and via a network node beam, a network node SSB; means for transmitting, to a UE and via an apparatus beam, an apparatus SSB that is based at least in part on the network node SSB; means for receiving, from the UE and via the apparatus beam, a preamble during a first RACH occasion that is associated with the apparatus SSB; and means for transmitting, to the network node and via the network node beam, the preamble during a second RACH occasion that is associated with the network node SSB.

In some implementations, an apparatus for wireless communication includes means for transmitting, to a relay and via an apparatus beam, an apparatus SSB, wherein a relay SSB is derived based at least in part on the apparatus SSB and is transmitted to a UE via a relay beam; and means for receiving, from the relay and via the apparatus beam, a preamble during a second RACH occasion that is associated with the apparatus SSB, wherein the preamble is received by the relay via the relay beam during a first RACH occasion that is associated with the relay SSB.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 7-8 are diagrams illustrating example processes associated with RACH occasions associated with a relay, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
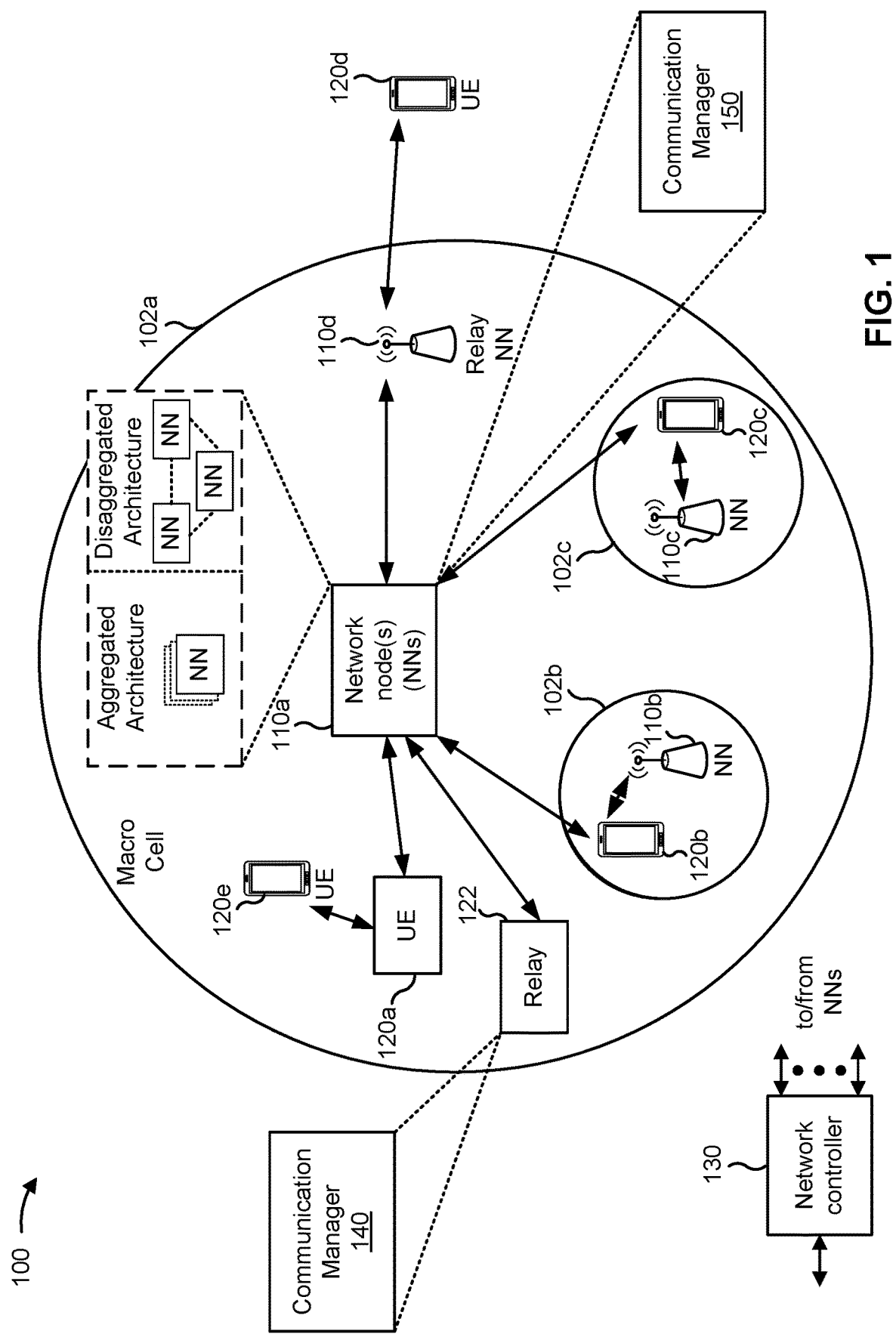
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the term "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the network node 110. In some aspects, the term "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations or one or more virtual base station functions. For example, in some aspects, two or more base station functions may be instantiated on a single device. In some aspects, the term "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a relay (e.g., relay 122) may include a communication manager 140. As described in more detail elsewhere herein, the communication manager 140 may receive, from a network node and via a network node beam, a network node synchronization signal block (SSB); transmit, to a UE and via a relay beam, a relay SSB that is based at least in part on the network node SSB; receive, from the UE and via the relay beam, a preamble during a first random access channel (RACH) occasion that is associated with the relay SSB; and transmit, to the network node and via the network node beam, the preamble during a second RACH occasion that is associated with the network node SSB. Additionally, or alternatively, the communication manager 140 may perform one or more other operations described herein.

In some aspects, a network node (e.g., network node 110) may include a communication manager 150. As described in more detail elsewhere herein, the communication manager 150 may transmit, to a relay and via a network node beam, a network node SSB, wherein a relay SSB is derived based at least in part on the network node SSB and is transmitted to a UE via a relay beam; and receive, from the relay and via the network node beam, a preamble during a second RACH occasion that is associated with the network node SSB, wherein the preamble is received by the relay via the relay beam during a first RACH occasion that is associated with the relay SSB. Additionally, or alternatively, the communication manager 150 may perform one or more other operations described herein.

As indicated above, FIG. 1 is provided as an example. Other examples may differ from what is described with regard to FIG. 1.

Figure 2:
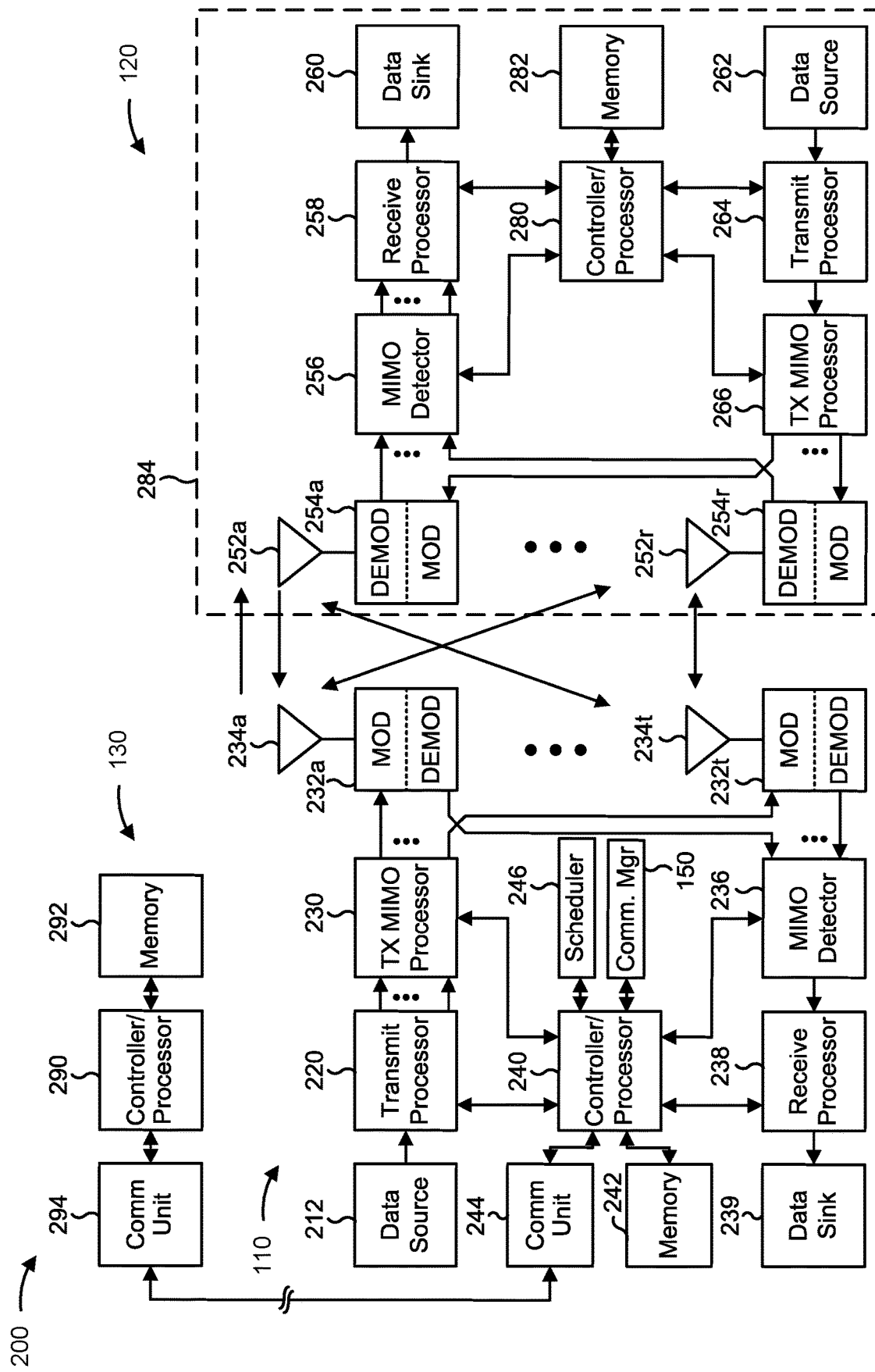
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MC S(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10.

The controller/processor 240 of the network node 110, the controller/processor 280 of the UE 120, and/or any other component(s) of FIG. 2 may perform one or more techniques associated with RACH occasions associated with a relay, as described in more detail elsewhere herein. In some aspects, the repeater described herein is the UE 120, is included in the UE 120, or includes one or more components of the UE 120 shown in FIG. 2. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a relay (e.g., relay 122) includes means for receiving, from a network node and via a network node beam, a network node SSB; means for transmitting, to a UE and via a relay beam, a relay SSB that is based at least in part on the network node SSB; means for receiving, from the UE and via the relay beam, a preamble during a first RACH occasion that is associated with the relay SSB; and/or means for transmitting, to the network node and via the network node beam, the preamble during a second RACH occasion that is associated with the network node SSB. In some aspects, the means for the relay to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., network node 110) includes means for transmitting, to a relay and via a network node beam, a network node SSB, wherein a relay SSB is derived based at least in part on the network node SSB and is transmitted to a UE via a relay beam; and/or means for receiving, from the relay and via the network node beam, a preamble during a second RACH occasion that is associated with the network node SSB, wherein the preamble is received by the relay via the relay beam during a first RACH occasion that is associated with the relay SSB. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
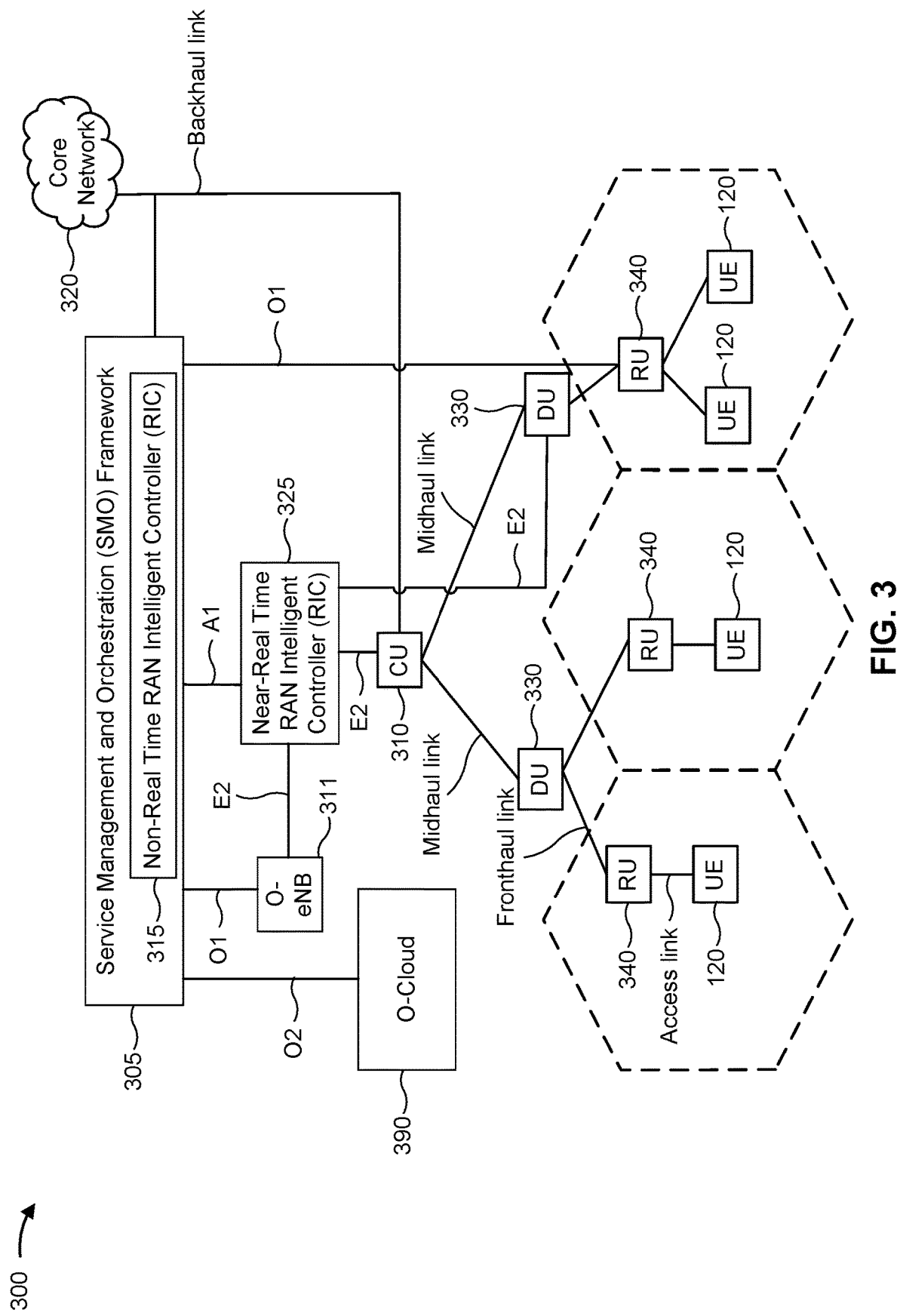
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

As carrier frequencies increase over time, from sub-6 GHz to mmW and further to sub-THz, line-of-sight (LOS) conditions may become more important, as diffraction effects become less pronounced. Further, penetration losses (e.g., outdoor-to-indoor scenarios) may become worse. Additional devices such as repeaters, relays, and/or reconfigurable intelligent surfaces (RISs) may be used in deployments in order to overcome expected reductions in coverage. Such devices may be amplify-and-forward devices, in which digital processing of relayed signals may be minimal or completely avoided.

From a physical layer perspective, a layer 1 (L1) random access procedure may involve a transmission of a random access preamble in a physical random access channel (PRACH) in an uplink (Msg1), a transmission of a random access response (RAR) message with a physical downlink control channel (PDCCH) or a physical downlink shared channel (PDSCH) in a downlink (Msg2), a transmission of a physical uplink shared channel (PUSCH) scheduled by a RAR uplink grant in the uplink (Msg3), and/or a transmission of a PDSCH for contention resolution in the downlink (Msg4).

With respect to an SSB and RACH occasion association, a UE may be provided with a quantity N of SSBs associated with one PRACH occasion and a quantity R of contention based preambles per SSB per valid PRACH occasion based at least in part on an SSB per RACH occasion and code block (CB) preambles per SSB (ssb-perRACH-OccasionAndCBPreamblesPerSSB) parameter. When $N \leq 1$, one SSB may be mapped to 1/N consecutive valid PRACH occasions and R contention based preambles with consecutive indexes associated with SSB n, $0 \leq n \leq N-1$, per valid PRACH occasion may start from preamble index 0. When $N \geq 1$, R contention based preambles with consecutive indexes associated with SSB n, $0 \leq n \leq N-1$, per valid PRACH occasion may start from preamble index n×Ntotal_preamble/N, where Ntotal_preamble may be provided by a total number of random access preambles (totalNumberOfRA-Preambles) parameter and may be an integer multiple of N.

SSB indexes may be mapped to valid PRACH occasions in accordance with an order, which may involve an increasing order of preamble indexes within a single PRACH occasion, an increasing order of frequency resource indexes for frequency multiplexed PRACH occasions, an increasing order of time resource indexes for time multiplexed PRACH occasions within a PRACH slot, and/or an increasing order of indexes for PRACH slots.

Figure 4:
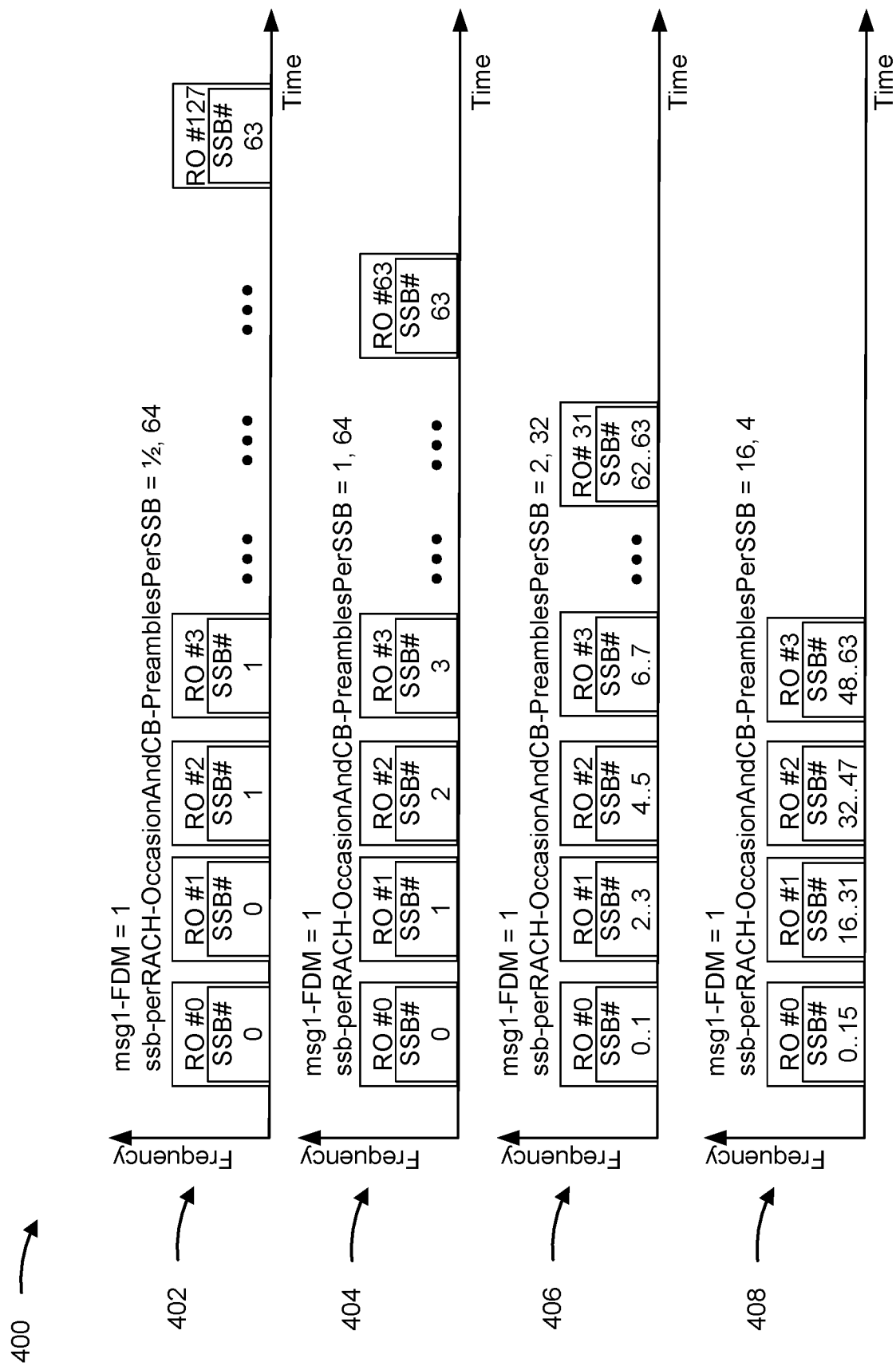
FIG. 4 is a diagram illustrating an example of a synchronization signal block (SSB) and random access channel (RACH) occasion association, in accordance with the present disclosure.

FIG. 4 is a diagram illustrating an example 400 of an SSB and RACH occasion association, in accordance with the present disclosure.

As shown by reference number 402, an ssb-perRACH-OccasionAndCBPreamblesPerSSB) parameter may be ½, 64, which may correspond to 128 RACH occasions (ROs). For example, RO #0 may include SSB #0, RO #1 may include SSB #0, RO #2 may include SSB #1, RO #3 may include SSB #1, and so on. As shown by reference number 404, an ssb-perRACH-OccasionAndCBPreamblesPerSSB) parameter may be 1, 64, which may correspond to 64 RACH occasions (ROs). For example, RO #0 may include SSB #0, RO #1 may include SSB #1, RO #2 may include SSB #2, RO #3 may include SSB #3, and so on. As shown by reference number 406, an ssb-perRACH-OccasionAndCBPreamblesPerSSB) parameter may be 2, 32, which may correspond to 32 RACH occasions (ROs). For example, RO #0 may include SSB #0 and SSB #1, RO #1 may include SSB #2 and SSB #3, and so on. As shown by reference number 408, an ssb-perRACH-OccasionAndCBPreamblesPerSSB) parameter may be 16, 4, which may correspond to 4 RACH occasions (ROs). For example, RO #0 may include SSB #0-15, RO #1 may include SSB #16-31, and so on.

As indicated above, FIG. 4 is provided as an example. Other examples may differ from what is described with regard to FIG. 4.

One problem is that the existing approach does not consider SSBs and RACH occasions with respect to a relay, which may be in a communication path between a network node and a UE. The relay may forward SSBs and preambles (as part of a RACH procedure) between the network node and the UE, and in the existing approach, the RACH occasions may be defined without accounting for the relay. As a result, there is a need to define a relationship between received and relayed SSBs on a downlink side, and a RACH on an uplink side.

In various aspects of techniques and apparatuses described herein, a relay may receive, from a network node and via a network node beam, a network node SSB. The relay may transmit, to a UE and via a relay beam, a relay SSB that is based at least in part on the network node SSB. The relay may receive, from the UE and via the relay beam, a preamble during a first RACH occasion that is associated with the relay SSB. The relay may transmit, to the network node and via the network node beam, the preamble during a second RACH occasion that is associated with the network node SSB. The first RACH occasion that is associated with the relay SSB and the second RACH occasion that is associated with the network node SSB may form a double RACH occasion for the UE. As a result, different RACH occasions may be allocated differently for relay and network node connections, such that a relationship may be defined between a relayed SSB and a first RACH occasion and a received SSB and a second RACH occasion.

In some aspects, the relay may be a semi-transparent relay with amplify-and-forward capabilities, as the relay may amplify and forward signals between the network node and the UE. The relay may be a beam steering amplify-and-forward relay that is configured to operate in sub-THz and mmW frequencies based at least in part on a double RACH occasion mapping. The relay may support a wide bandwidth operation for data together with minimal processing SSB generation and beam management. The relay may utilize a double RACH occasion procedure, which may be based at least in part on the first RACH occasion and the second RACH occasion. Optionally, the UE may utilize sidelink messages for establishing an association between the UE and the relay beam. The relay may be assigned with multiple RACH occasions and SSB slots for use in a coverage area of the relay. Further, a full beam management procedure may be enabled for the relay, together with wideband and low latency operation for data by an amplify-and-forward action.

Figure 5:
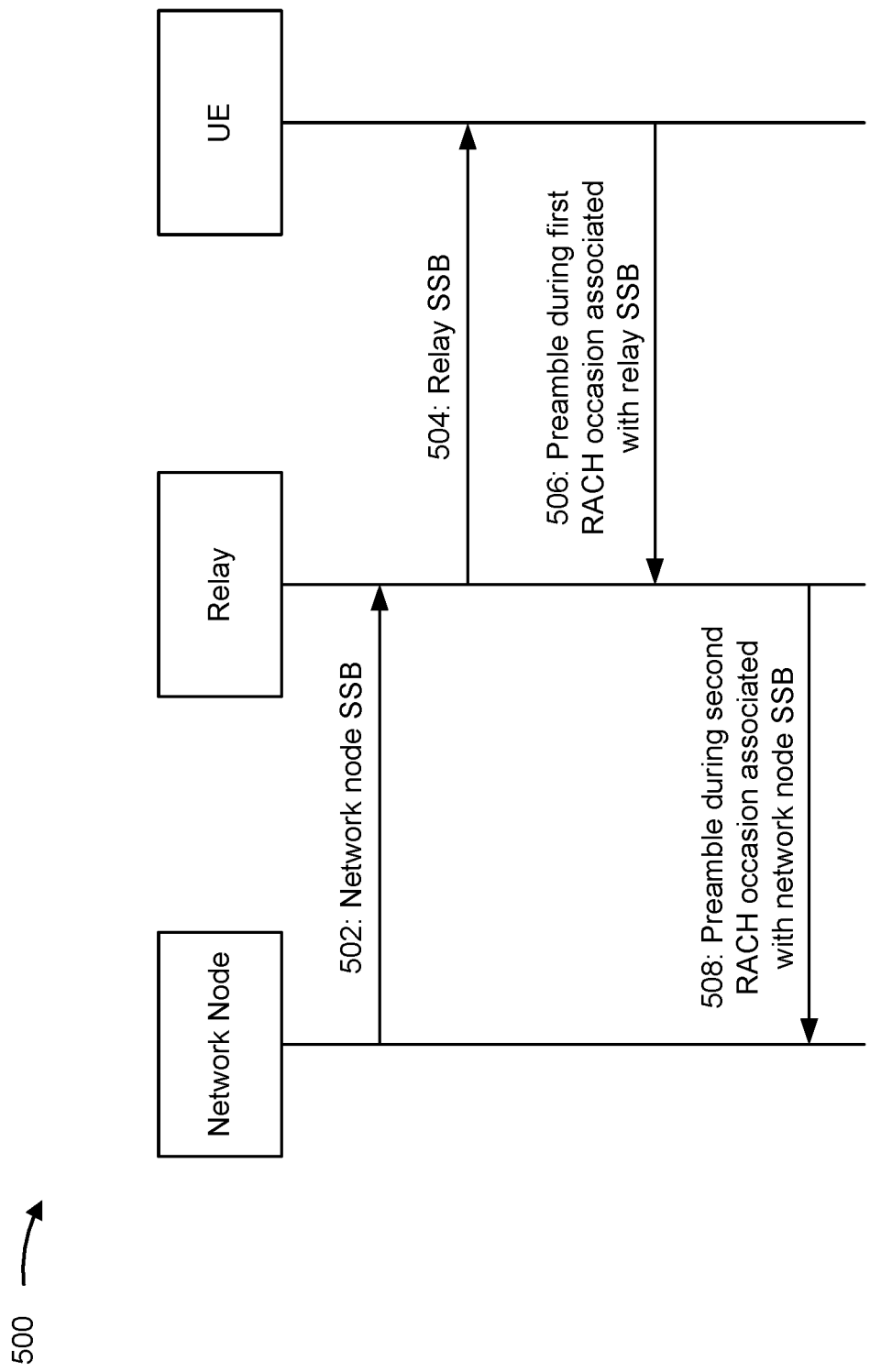
FIG. 5 is a diagram illustrating an example associated with RACH occasions associated with a relay, in accordance with the present disclosure.

FIG. 5 is a diagram illustrating an example 500 associated with RACH occasions associated with a relay, in accordance with the present disclosure. As shown in FIG. 5, communication may occur between a network node (e.g., network node 110), a relay (e.g., relay 122), and a UE (e.g., UE 120). In some aspects, the network node, the relay, and the UE may be included in a wireless network, such as wireless network 100.

As shown by reference number 502, the network node may transmit, to the relay (or repeater) and via a network node beam, a network node SSB. The relay may receive, from the network node and via the network node beam, the network node SSB. The relay may receive the network node SSB via the network node beam based at least in part on a direction of the relay in relation to the network node. The network node beam may be one of a plurality of network node beams, where other network node beams of the plurality of network node beams may not correspond to the direction of the relay. The relay may be in a connected mode with respect to the network node.

As shown by reference number 504, the relay may transmit, to the UE and via a relay beam, a relay SSB that is based at least in part on the network node SSB. The UE may receive, from the relay and via the relay beam, the relay SSB, which may be based at least in part on the network node SSB. The relay SSB may correspond to the network node SSB. In other words, the relay may forward an SSB received from the network node to the UE. The UE may receive the relay SSB via the relay beam based at least in part on a direction of the UE in relation to the relay. The relay beam may be one of a plurality of relay beams, where other relay beams of the plurality of relay beams may not correspond to the direction of the UE. The UE may be within a coverage area of the relay (e.g., within a relay coverage area). The UE may be not within a coverage area of the network node (e.g., the UE may be hidden from the network node).

As shown by reference number 506, the UE may transmit, to the relay and via the relay beam, a preamble during a first RACH occasion that is associated with the relay SSB. The relay may receive, from the UE and via the relay beam, the preamble during the first RACH occasion that is associated with the relay SSB. The first RACH occasion may be correlated with or mapped to the relay SSB, which may allow a selection of a correct relay beam. The first RACH occasion may be associated with time and frequency resources for transmitting the preamble from the UE to the relay. The first RACH occasion may be a relay-oriented RACH occasion. In some aspects, the relay may assist the UE in performing an initial acquisition, where the UE may transmit the preamble as part of the initial acquisition.

In some aspects, the relay may transmit, to the UE, a sidelink message for establishing an association between the UE and the relay beam. The sidelink message may function to establish the association between the UE and the relay beam, instead of the relay SSB. The relay may transmit the sidelink message, via a sidelink interface between the relay and the UE, instead of transmitting the relay SSB that is based at least in part on the network node SSB.

As shown by reference number 508, the relay may transmit, to the network node and via the network node beam, the preamble during a second RACH occasion that is associated with the network node SSB. The network node may receive, from the relay and via the network node beam, the preamble during the second RACH occasion that is associated with the network node SSB. The second RACH occasion may be correlated with or mapped to the network node SSB in order to establish a transparent amplify-and-forward connection to the network node. The second RACH occasion may be associated with time and frequency resources for transmitting the preamble from the relay to the network node. The second RACH occasion may be a network node oriented RACH occasion.

In some aspects, the preamble may be transmitted from the UE to the network through the relay, which may operate in a transparent mode at this stage. The relay may forward (or relay) the preamble received from the UE to the network node. The network node may receive, from the UE (through the relay) and via the network node beam, the preamble during the second RACH occasion that is associated with the network node SSB.

In some aspects, the first RACH occasion that is associated with the relay SSB and the second RACH occasion that is associated with the network node SSB may form a double RACH occasion for the UE. In other words, the UE may transmit the preamble using two separate RACH occasions, where the first RACH occasion may be for transmitting the preamble from the UE to the relay, and the second RACH occasion may be for forwarding the preamble from the relay to the network node.

In some aspects, after SSB transmissions (e.g., network node and relay SSB transmissions) and preamble transmissions between the network node and the UE, a connection may be established between the UE and the network node using the relay beam and the network node beam, and subsequent communications may be associated with near-zero delay in an amplify-and-forward mode of the relay. The relay may transmit signals received from the network node to the UE based at least in part on the amplify-and-forward mode of the relay. The UE may transmit signals received from the UE to the network node based at least in part on the amplify-and-forward mode of the relay. The relay, when operating in the amplify-and-forward mode, may amplify and forward wideband data streams between the network node and the UE, based at least in part on the relay being in the connected mode. During the amplify-and-forward mode, the relay may act as a semi-transparent relay with amplify-and-forward capabilities for minimal latency.

In some aspects, the relay may transmit, to the UE, a master information block (MIB), a system information block (SIB), or RRC signaling that indicates a first association between the first RACH occasion and the relay SSB and a second association between the second RACH occasion and the network node SSB. The relay may receive the MIB, the SIB, or the RRC signaling from the network node, and the relay may forward the MIB, the SIB, or the RRC signaling to the UE. The first association may be an internal association, and the second association may be an external association, since the first association may be based at least in part on communications within a structure (e.g., a building) and the second association may be based at least in part on communications outside a structure. In other words, the UE may become notified, via the MIB, the SIB, or the RRC signaling, that the first RACH occasion is associated with the relay SSB and that the second RACH occasion is associated with the network node SSB.

In some aspects, the relay may receive, from the network node, an indication that assigns multiple RACH occasions and SSB slots for use in a coverage area of the relay. The relay may be configured to transmit multiple relay SSBs, which may be based at least in part on one or more network node SSBs. The multiple relay SSBs may be associated with the multiple RACH occasions, and the one or more network node SSBs may be associated with one or more RACH occasions.

As indicated above, FIG. 5 is provided as an example. Other examples may differ from what is described with regard to FIG. 5.

Figure 6A:
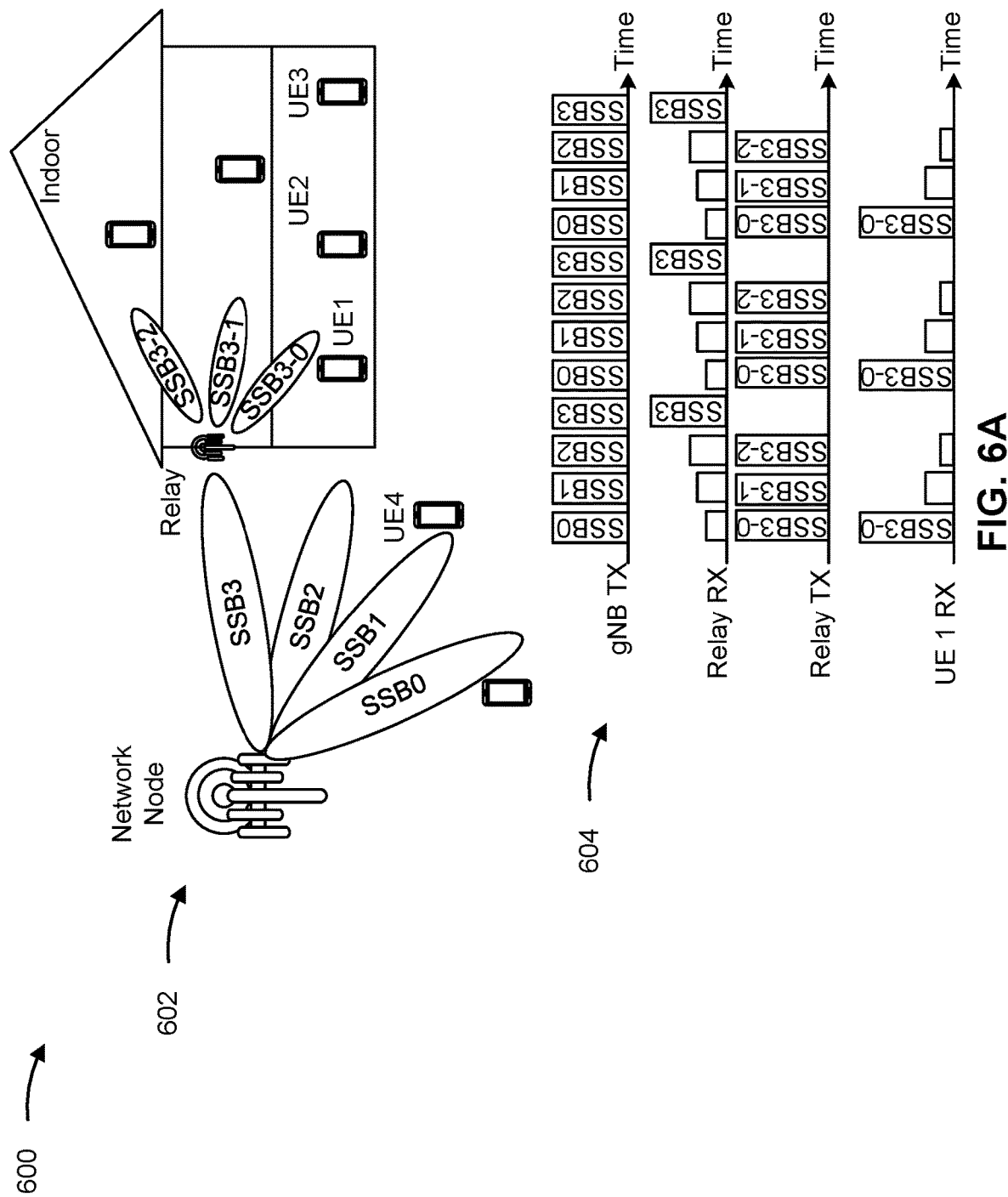
FIGS. 6A-6B are diagrams illustrating examples associated with RACH occasions associated with a relay, in accordance with the present disclosure.
Figure 6B:
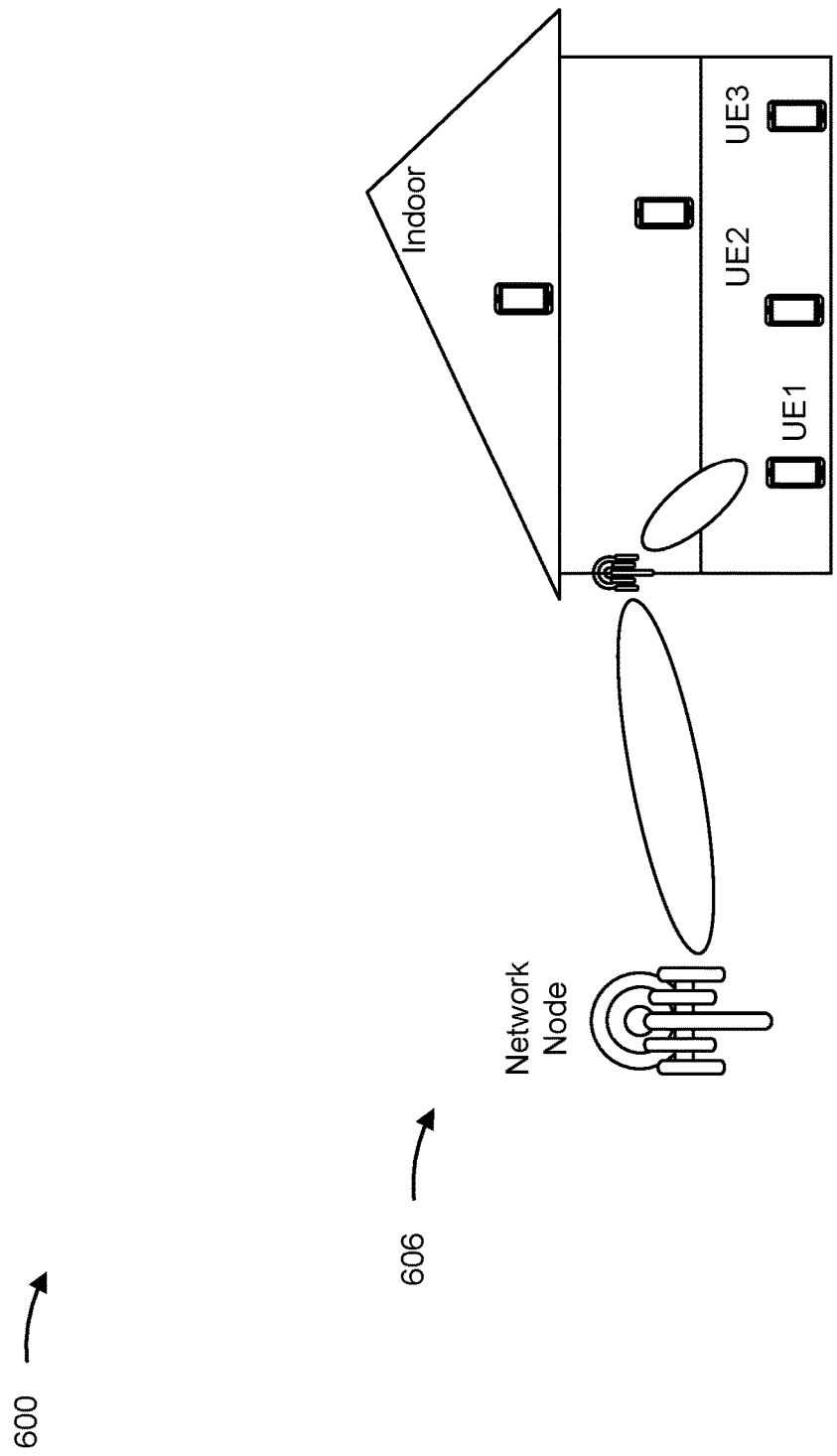

FIGS. 6A-6B are diagrams illustrating examples 600 associated with RACH occasions associated with a relay, in accordance with the present disclosure.

In some aspects, a network node may communicate with a plurality of devices, which may include a UE (e.g., UE 4) and a relay (or repeater). The relay may be installed on a window of a structure (e.g., a house), and a plurality of UEs (e.g., UE 1, UE 2, and UE 3) may be located within the structure. The network node may communicate directly with the UE. The network node may communicate with the plurality of UEs via the relay. The relay may provide an "amplify and forward" capability, such that the relay may amplify and forward a wideband data stream when operating in a connected mode. The relay may amplify and forward the wideband data stream in a downlink direction or in an uplink direction. The relay may be in the connected mode with respect to the network node. The relay may perform minimal processing for SSBs and RACH signaling. The plurality of UEs within a relay coverage area may only be visible to the relay, and may be hidden from the network node. The plurality of UEs may perform an initial acquisition assisted by the relay.

As shown in FIG. 6A, and by reference number 602, the network node may be associated with four network node beams, where a first network node beam is associated with SSB 0, a second network node beam is associated with SSB 1, a third network node beam is associated with SSB 2, and a fourth network node beam is associated with SSB 3. SSB 0, SSB 1, SSB 2, and SSB 3 may be network node SSBs. The network node may communicate with the UE (e.g., UE 4) via the second beam. The network node may communicate with the relay via the fourth beam, based at least in part on a direction of the relay in relation to the network node. In other words, the relay may be connected to a beam with SSB 3. The relay may generate new SSBs, which may be based at least in part on SSB 3. For example, the relay may generate a first relay beam associated with SSB 3-0, a second relay beam associated with SSB 3-1, and a third relay beam associated with SSB 3-2. SSB 3-0, SSB 3-1, and SSB 3-2 may be relay SSBs. The relay may generate SSB 3-0, SSB 3-1, and SSB 3-2 with the same periodicity as the network node originated SSBs. The relay may skip a fourth relay beam associated with SSB 3-3, which may enable UEs that are within coverage of both the network node and the relay to attach to the network node (when preferrable). In this example, the first UE (UE 1) may attempt to connect to a relay beam carrying SSB 3-0, based at least in part on a direction of the first UE in relation to the relay.

As shown by reference number 604, in a network node Tx timeline, the network node may transmit SSB 0, SSB 1, SSB 2, and SSB 3, and then repeat this process. In a relay Rx timeline, the relay may receive SSB 3 from the network node. The relay may receive SSB 0, SSB 1, and/or SSB 2 from the network node, but associated signal measurements may not satisfy a threshold. In a relay Tx timeline, the relay may transmit SSB 3-0, SSB 3-1, and SSB 3-2 to the plurality of UEs, and then repeat this process (while skipping SSB 3-3). The relay may transmit SSB 3-0, SSB 3-1, and SSB 3-2 to the plurality of UEs when the network node transmits SSB 0, SSB 1, and SSB 2, which are not as likely to be received by the plurality of UEs. In a UE 1 Rx timeline, the first UE may receive SSB 3-0 from the relay. The first UE may also receive SSB 3-1 and SSB 3-2, but associated signal measurements may not satisfy the threshold.

As shown in FIG. 6B, and by reference number 606, the UE may transmit, to the relay, a preamble using a first RACH occasion, which may be associated with SSB 3-0. The relay may forward (or relay) the preamble, to the network node, using a second RACH occasion, which may be associated with SSB 3. The first RACH occasion, which may be associated with SSB 3-0, and the second RACH occasion, which may be associated with SSB 3, may form a double RACH occasion for the UE. RACH occasions may be specified differently for different SSB beams between the network node and the relay. In some aspects, the UE may transmit to preamble to the network node through the relay, which may operate in a transparent mode at this stage. The network node may receive, from the UE and via SSB 3, the preamble during the second RACH occasion.

In some aspects, after the UE transmits the preamble to the network node and an initial acquisition is completed, the relay may operate in an amplify-and-forward mode, in which communications (e.g., wideband data streams) may be amplified and forwarded between the network node and the UE with near-zero delay. The amplify-and-forward mode may be a transparent (or semi-transparent) mode, such that the network node and the UE may not be aware that the relay is amplifying and forwarding data. For example, subsequent communications may be based at least in part on the network node beam associated with SSB 3, and the relay beam associated with SSB 3-0.

As indicated above, FIGS. 6A-6B are provided as examples. Other examples may differ from what is described with regard to FIGS. 6A-6B.

FIG. 7 is a diagram illustrating an example process 700 performed, for example, by a relay, in accordance with the present disclosure. Example process 700 is an example where the relay (e.g., relay 122) performs operations associated with RACH occasions associated with a relay.

As shown in FIG. 7, in some aspects, process 700 may include receiving, from a network node and via a network node beam, a network node SSB (block 710). For example, the relay (e.g., using reception component 902, depicted in FIG. 9) may receive, from a network node and via a network node beam, a network node SSB, as described above.

As further shown in FIG. 7, in some aspects, process 700 may include transmitting, to a UE and via a relay beam, a relay SSB that is based at least in part on the network node SSB (block 720). For example, the relay (e.g., using transmission component 904, depicted in FIG. 9) may transmit, to a UE and via a relay beam, a relay SSB that is based at least in part on the network node SSB, as described above.

As further shown in FIG. 7, in some aspects, process 700 may include receiving, from the UE and via the relay beam, a preamble during a first RACH occasion that is associated with the relay SSB (block 730). For example, the relay (e.g., using reception component 902, depicted in FIG. 9) may receive, from the UE and via the relay beam, a preamble during a first RACH occasion that is associated with the relay SSB, as described above.

As further shown in FIG. 7, in some aspects, process 700 may include transmitting, to the network node and via the network node beam, the preamble during a second RACH occasion that is associated with the network node SSB (block 740). For example, the relay (e.g., using transmission component 904, depicted in FIG. 9) may transmit, to the network node and via the network node beam, the preamble during a second RACH occasion that is associated with the network node SSB, as described above.

Process 700 may include additional aspects, such as any single aspect or any combination of aspects described below and/or in connection with one or more other processes described elsewhere herein.

In a first aspect, the first RACH occasion that is associated with the relay SSB and the second RACH occasion that is associated with the network node SSB form a double RACH occasion for the UE.

In a second aspect, alone or in combination with the first aspect, process 700 includes transmitting signals received from the network node to the UE based at least in part on an amplify-and-forward mode of the relay, or transmitting signals received from the UE to the network node based at least in part on the amplify-and-forward mode of the relay.

In a third aspect, alone or in combination with one or more of the first and second aspects, the UE is in a connected mode and within a coverage area of the relay, and the UE is not within a coverage area of the network node.

In a fourth aspect, alone or in combination with one or more of the first through third aspects, process 700 includes assisting the UE in performing an initial acquisition, wherein the preamble is received from the UE as part of the initial acquisition.

In a fifth aspect, alone or in combination with one or more of the first through fourth aspects, process 700 includes transmitting, to the UE, one of a MIB, a SIB, or RRC signaling that indicates a first association between the first RACH occasion and the relay SSB and a second association between the second RACH occasion and the network node SSB.

In a sixth aspect, alone or in combination with one or more of the first through fifth aspects, process 700 includes transmitting, to the UE, a sidelink message for establishing an association between the UE and the relay beam.

In a seventh aspect, alone or in combination with one or more of the first through sixth aspects, process 700 includes receiving, from the network node, an indication that assigns multiple RACH occasions and SSB slots for use in a coverage area of the relay.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
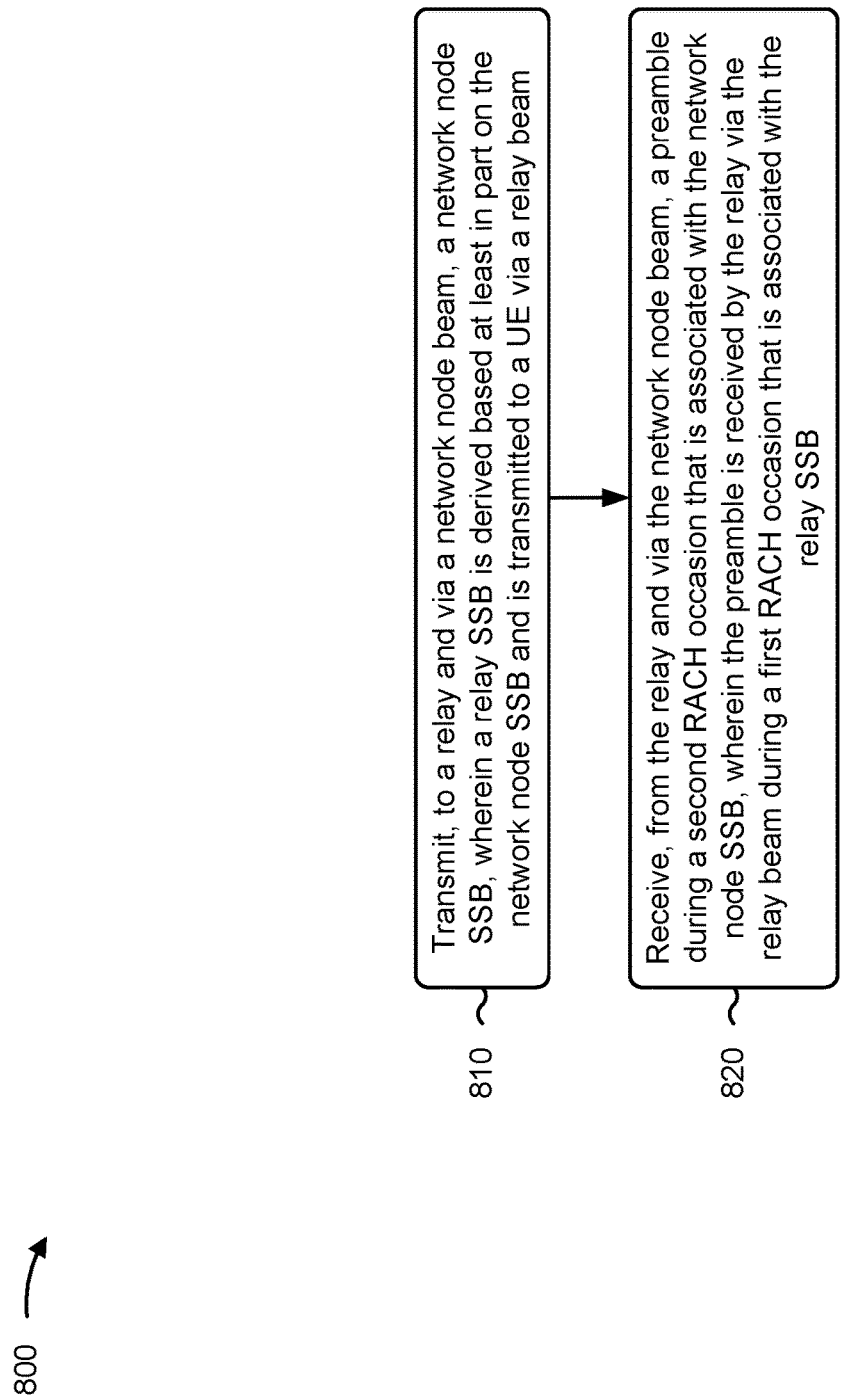

FIG. 8 is a diagram illustrating an example process 800 performed, for example, by a network node, in accordance with the present disclosure. Example process 800 is an example where the network node (e.g., network node 110) performs operations associated with RACH occasions associated with a relay.

As shown in FIG. 8, in some aspects, process 800 may include transmitting, to a relay and via a network node beam, a network node SSB, wherein a relay SSB is derived based at least in part on the network node SSB and is transmitted to a UE via a relay beam (block 810). For example, the network node (e.g., using transmission component 1004, depicted in FIG. 10) may transmit, to a relay and via a network node beam, a network node SSB, wherein a relay SSB is derived based at least in part on the network node SSB and is transmitted to a UE via a relay beam, as described above.

As further shown in FIG. 8, in some aspects, process 800 may include receiving, from the relay and via the network node beam, a preamble during a second RACH occasion that is associated with the network node SSB, wherein the preamble is received by the relay via the relay beam during a first RACH occasion that is associated with the relay SSB (block 820). For example, the network node (e.g., using reception component 1002, depicted in FIG. 10) may receive, from the relay and via the network node beam, a preamble during a second RACH occasion that is associated with the network node SSB, wherein the preamble is received by the relay via the relay beam during a first RACH occasion that is associated with the relay SSB, as described above.

Process 800 may include additional aspects, such as any single aspect or any combination of aspects described below and/or in connection with one or more other processes described elsewhere herein.

In a first aspect, the first RACH occasion that is associated with the relay SSB and the second RACH occasion that is associated with the network node SSB form a double RACH occasion for the UE.

In a second aspect, alone or in combination with the first aspect, process 800 includes transmitting, to the UE and via the relay, signals based at least in part on an amplify-and-forward mode of the relay, or receiving, from the UE and via the relay, signals based at least in part on the amplify-and-forward mode of the relay.

In a third aspect, alone or in combination with one or more of the first and second aspects, the UE is in a connected mode and within a coverage area of the relay, and the UE is not within a coverage area of the network node.

In a fourth aspect, alone or in combination with one or more of the first through third aspects, process 800 includes receiving, from the UE and via the relay, the preamble as part of an initial acquisition, wherein the initial acquisition is based at least in part on the first RACH occasion and the second RACH occasion.

In a fifth aspect, alone or in combination with one or more of the first through fourth aspects, process 800 includes transmitting, to the UE and via the relay, one of a MIB, a SIB, or RRC signaling that indicates a first association between the first RACH occasion and the relay SSB and a second association between the second RACH occasion and the network node SSB.

In a sixth aspect, alone or in combination with one or more of the first through fifth aspects, process 800 includes transmitting, to the relay, an indication that assigns multiple RACH occasions and SSB slots for use in a coverage area of the relay.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
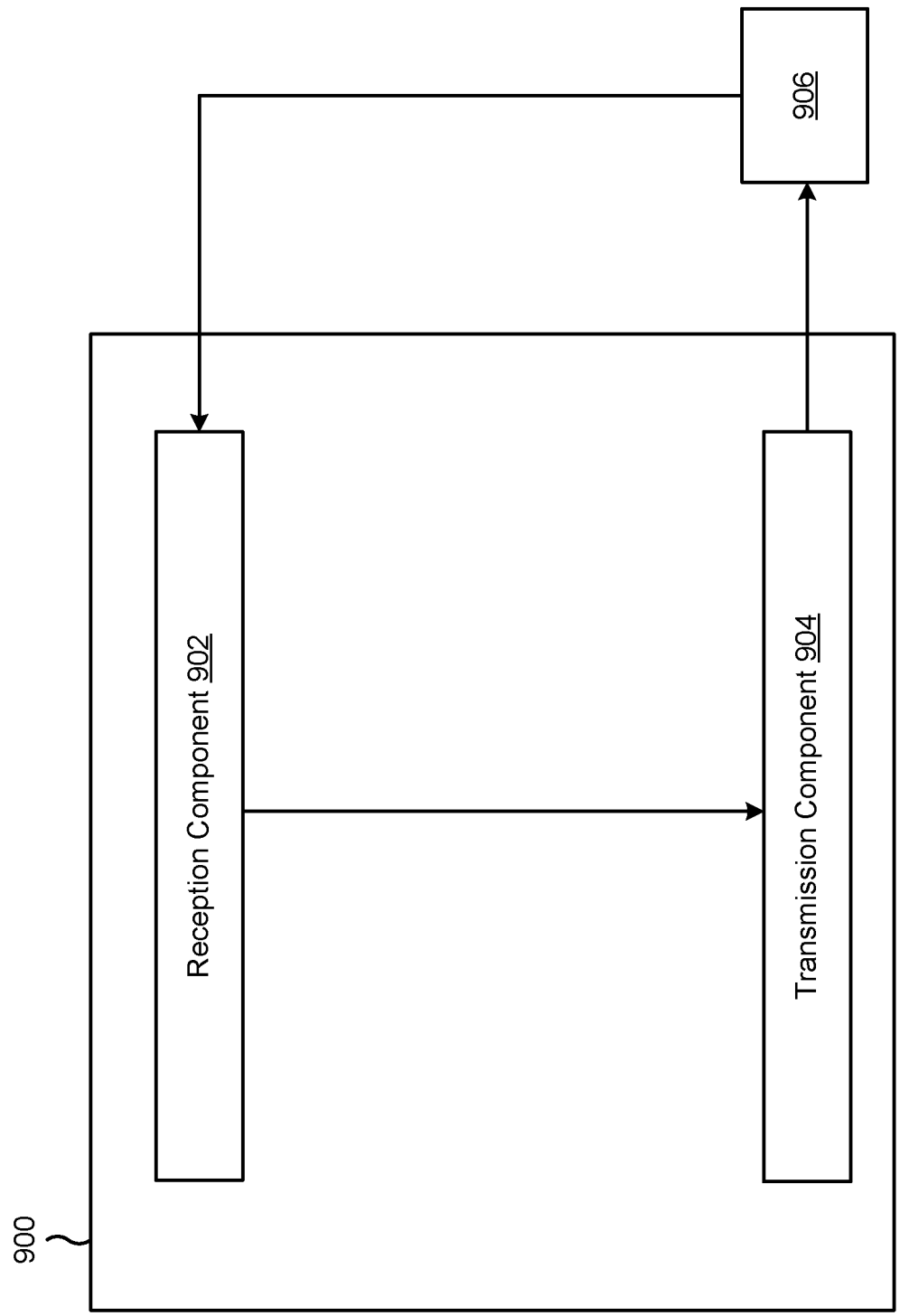
FIGS. 9-10 are diagrams of example apparatuses for wireless communication, in accordance with the present disclosure.

FIG. 9 is a diagram of an example apparatus 900 for wireless communication, in accordance with the present disclosure. The apparatus 900 may be a relay, or a relay may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904.

In some aspects, the apparatus 900 may be configured to perform one or more operations described herein in connection with FIGS. 5, 6A, and 6B. Additionally, or alternatively, the apparatus 900 may be configured to perform one or more processes described herein, such as process 700 of FIG. 7. In some aspects, the apparatus 900 and/or one or more components shown in FIG. 9 may include one or more components of the relay described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the relay described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the relay described in connection with FIG. 2. In some aspects, the transmission component 904 may be co-located with the reception component 902 in a transceiver.

The reception component 902 may receive, from a network node and via a network node beam, a network node SSB. The transmission component 904 may transmit, to a UE and via a relay beam, a relay SSB that is based at least in part on the network node SSB. The reception component 902 may receive, from the UE and via the relay beam, a preamble during a first RACH occasion that is associated with the relay SSB. The transmission component 904 may transmit, to the network node and via the network node beam, the preamble during a second RACH occasion that is associated with the network node SSB.

The transmission component 904 may transmit signals received from the network node to the UE based at least in part on an amplify-and-forward mode of the relay. The transmission component 904 may transmit signals received from the UE to the network node based at least in part on the amplify-and-forward mode of the relay. The transmission component 904 may transmit, to the UE, one of a MIB, a SIB, or RRC signaling that indicates a first association between the first RACH occasion and the relay SSB and a second association between the second RACH occasion and the network node SSB. The transmission component 904 may transmit, to the UE, a sidelink message for establishing an association between the UE and the relay beam. The reception component 902 may receive, from the network node, an indication that assigns multiple RACH occasions and SSB slots for use in a coverage area of the relay.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
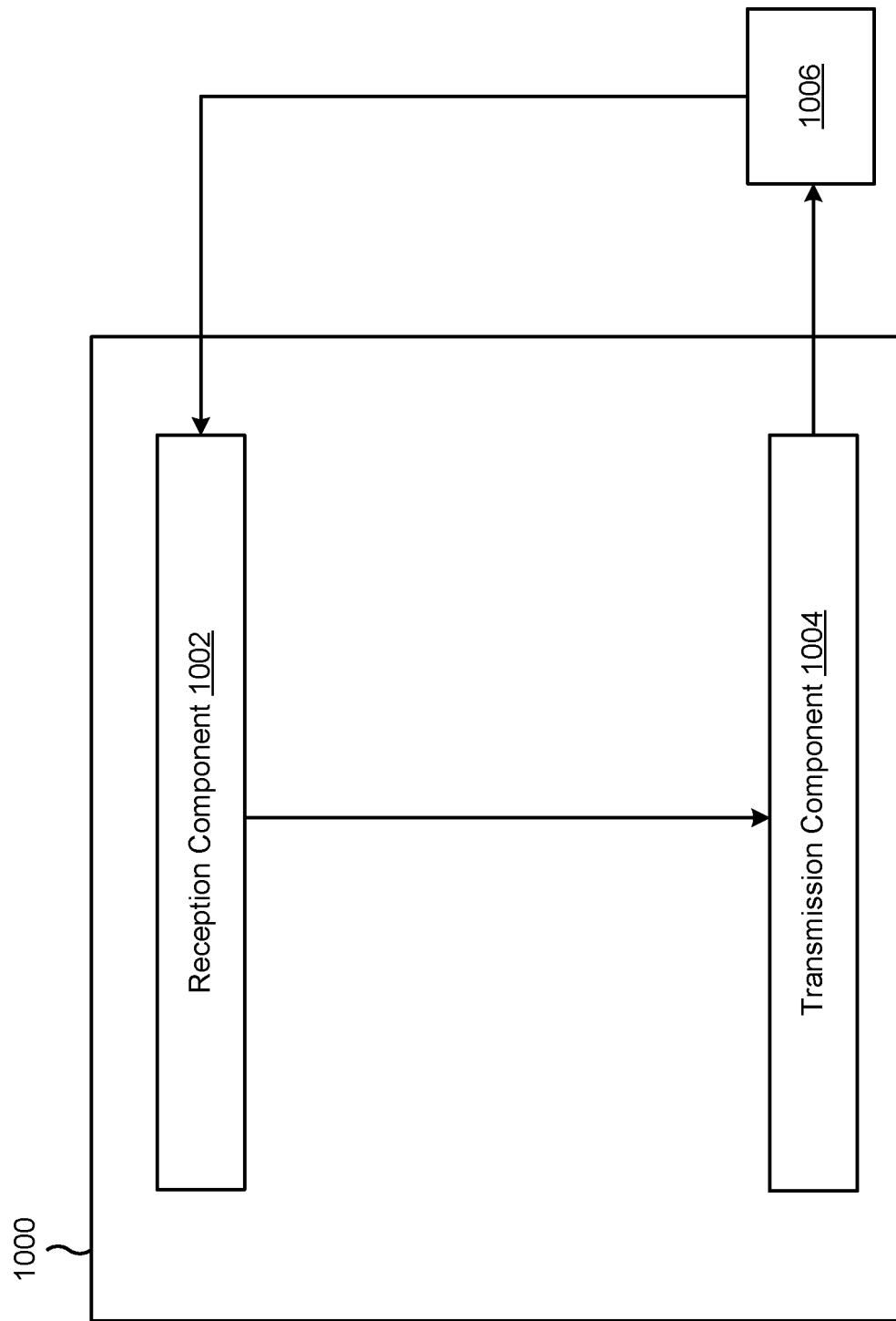

FIG. 10 is a diagram of an example apparatus 1000 for wireless communication, in accordance with the present disclosure. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004.

In some aspects, the apparatus 1000 may be configured to perform one or more operations described herein in connection with FIGS. 5, 6A, and 6B. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The transmission component 1004 may transmit, to a relay and via a network node beam, a network node SSB, wherein a relay SSB is derived based at least in part on the network node SSB and is transmitted to a UE via a relay beam. The reception component 1002 may receive, from the relay and via the network node beam, a preamble during a second RACH occasion that is associated with the network node SSB, wherein the preamble is received by the relay via the relay beam during a first RACH occasion that is associated with the relay SSB.

The transmission component 1004 may transmit, to the UE and via the relay, signals based at least in part on an amplify-and-forward mode of the relay. The reception component 1002 may receive, from the UE and via the relay, signals based at least in part on the amplify-and-forward mode of the relay. The reception component 1002 may receive, from the UE and via the relay, the preamble as part of an initial acquisition, wherein the initial acquisition is based at least in part on the first RACH occasion and the second RACH occasion. The transmission component 1004 may transmit, to the UE and via the relay, one of a MIB, a SIB, or RRC signaling that indicates a first association between the first RACH occasion and the relay SSB and a second association between the second RACH occasion and the network node SSB. The transmission component 1004 may transmit, to the relay, an indication that assigns multiple RACH occasions and SSB slots for use in a coverage area of the relay.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a relay, comprising: receiving, from a network node and via a network node beam, a network node synchronization signal block (SSB); transmitting, to a user equipment (UE) and via a relay beam, a relay SSB that is based at least in part on the network node SSB; receiving, from the UE and via the relay beam, a preamble during a first random access channel (RACH) occasion that is associated with the relay SSB; and transmitting, to the network node and via the network node beam, the preamble during a second RACH occasion that is associated with the network node SSB.

Aspect 2: The method of Aspect 1, wherein the first RACH occasion that is associated with the relay SSB and the second RACH occasion that is associated with the network node SSB form a double RACH occasion for the UE.

Aspect 3: The method of any of Aspects 1 through 2, further comprising: transmitting signals received from the network node to the UE based at least in part on an amplify-and-forward mode of the relay; or transmitting signals received from the UE to the network node based at least in part on the amplify-and-forward mode of the relay.

Aspect 4: The method of any of Aspects 1 through 3, wherein the UE is in a connected mode and within a coverage area of the relay, and wherein the UE is not within a coverage area of the network node.

Aspect 5: The method of any of Aspects 1 through 4, further comprising: assisting the UE in performing an initial acquisition, wherein the preamble is received from the UE as part of the initial acquisition.

Aspect 6: The method of any of Aspects 1 through 5, further comprising: transmitting, to the UE, one of a master information block, a system information block, or radio resource control signaling that indicates a first association between the first RACH occasion and the relay SSB and a second association between the second RACH occasion and the network node SSB.

Aspect 7: The method of any of Aspects 1 through 6, further comprising: transmitting, to the UE, a sidelink message for establishing an association between the UE and the relay beam.

Aspect 8: The method of any of Aspects 1 through 7, further comprising: receiving, from the network node, an indication that assigns multiple RACH occasions and SSB slots for use in a coverage area of the relay.

Aspect 9: A method of wireless communication performed by a network node, comprising: transmitting, to a relay and via a network node beam, a network node synchronization signal block (SSB), wherein a relay SSB is derived based at least in part on the network node SSB and is transmitted to a user equipment (UE) via a relay beam; and receiving, from the relay and via the network node beam, a preamble during a second random access channel (RACH) occasion that is associated with the network node SSB, wherein the preamble is received by the relay via the relay beam during a first RACH occasion that is associated with the relay SSB.

Aspect 10: The method of Aspect 9, wherein the first RACH occasion that is associated with the relay SSB and the second RACH occasion that is associated with the network node SSB form a double RACH occasion for the UE.

Aspect 11: The method of any of Aspects 9 through 10, further comprising: transmitting, to the UE and via the relay, signals based at least in part on an amplify-and-forward mode of the relay; or receiving, from the UE and via the relay, signals based at least in part on the amplify-and-forward mode of the relay.

Aspect 12: The method of any of Aspects 9 through 11, wherein the UE is in a connected mode and within a coverage area of the relay, and wherein the UE is not within a coverage area of the network node.

Aspect 13: The method of any of Aspects 9 through 12, further comprising: receiving, from the UE and via the relay, the preamble as part of an initial acquisition, wherein the initial acquisition is based at least in part on the first RACH occasion and the second RACH occasion.

Aspect 14: The method of any of Aspects 9 through 13, further comprising: transmitting, to the UE and via the relay, one of a master information block, a system information block, or radio resource control signaling that indicates a first association between the first RACH occasion and the relay SSB and a second association between the second RACH occasion and the network node SSB.

Aspect 15: The method of any of Aspects 9 through 14, further comprising: transmitting, to the relay, an indication that assigns multiple RACH occasions and SSB slots for use in a coverage area of the relay.

Aspect 16: An apparatus for wireless communication at a device, comprising a processor; memory coupled with the processor; and instructions stored in the memory and executable by the processor to cause the apparatus to perform the method of one or more of Aspects 1-8.

Aspect 17: A device for wireless communication, comprising a memory and one or more processors coupled to the memory, the one or more processors configured to perform the method of one or more of Aspects 1-8.

Aspect 18: An apparatus for wireless communication, comprising at least one means for performing the method of one or more of Aspects 1-8.

Aspect 19: A non-transitory computer-readable medium storing code for wireless communication, the code comprising instructions executable by a processor to perform the method of one or more of Aspects 1-8.

Aspect 20: A non-transitory computer-readable medium storing a set of instructions for wireless communication, the set of instructions comprising one or more instructions that, when executed by one or more processors of a device, cause the device to perform the method of one or more of Aspects 1-8.

Aspect 21: An apparatus for wireless communication at a device, comprising a processor; memory coupled with the processor; and instructions stored in the memory and executable by the processor to cause the apparatus to perform the method of one or more of Aspects 9-15.

Aspect 22: A device for wireless communication, comprising a memory and one or more processors coupled to the memory, the one or more processors configured to perform the method of one or more of Aspects 9-15.

Aspect 23: An apparatus for wireless communication, comprising at least one means for performing the method of one or more of Aspects 9-15.

Aspect 24: A non-transitory computer-readable medium storing code for wireless communication, the code comprising instructions executable by a processor to perform the method of one or more of Aspects 9-15.

Aspect 25: A non-transitory computer-readable medium storing a set of instructions for wireless communication, the set of instructions comprising one or more instructions that, when executed by one or more processors of a device, cause the device to perform the method of one or more of Aspects 9-15.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a relay, comprising:
    a memory; and
    one or more processors, coupled to the memory, configured to:
        receive, from a network node and via a network node beam, a network node synchronization signal block (SSB);
        transmit, to a user equipment (UE) and via a relay beam, a relay SSB that is based at least in part on the network node SSB;
        receive, from the UE and via the relay beam, a preamble during a first random access channel (RACH) occasion that is associated with the relay SSB;
        transmit, to the network node and via the network node beam, the preamble during a second RACH occasion that is associated with the network node SSB; and
        transmit, to the UE, one of a master information block or radio resource control signaling, the one of the master information block or the radio resource control signaling indicating a first association between the first RACH occasion and the relay SSB and a second association between the second RACH occasion and the network node SSB.

2. The apparatus of claim 1, wherein the first RACH occasion that is associated with the relay SSB and the second RACH occasion that is associated with the network node SSB form a double RACH occasion for the UE.

3. The apparatus of claim 1, wherein the one or more processors are further configured to:
    transmit signals received from the network node to the UE based at least in part on an amplify-and-forward mode of the relay; or
    transmit signals received from the UE to the network node based at least in part on the amplify-and-forward mode of the relay.

4. The apparatus of claim 1, wherein the UE is in a connected mode and within a coverage area of the relay, and wherein the UE is not within a coverage area of the network node.

5. The apparatus of claim 1, wherein the one or more processors are further configured to:
    assist the UE in performing an initial acquisition, wherein the preamble is received by the relay and from the UE as part of the initial acquisition, and wherein the initial acquisition is based at least in part on the first RACH occasion and the second RACH occasion.

6. The apparatus of claim 1, wherein the one or more processors are further configured to:
    transmit, to the UE, a sidelink message for establishing an association between the UE and the relay beam.

7. The apparatus of claim 1, wherein the one or more processors are further configured to:
    receive, from the network node, an indication that assigns multiple RACH occasions and SSB slots for use in a coverage area of the relay.

8. The apparatus of claim 1, wherein the first association is based at least in part on communications within a building and the second association is based at least in part on communications outside the building.

9. An apparatus for wireless communication at a network node, comprising:
    a memory; and
    one or more processors, coupled to the memory, configured to:
        transmit, to a relay and via a network node beam, a network node synchronization signal block (SSB), wherein a relay SSB is derived based at least in part on the network node SSB and is transmitted to a user equipment (UE) via a relay beam;
        receive, from the relay and via the network node beam, a preamble during a second random access channel (RACH) occasion that is associated with the network node SSB, wherein the preamble is received by the relay via the relay beam during a first RACH occasion that is associated with the relay SSB; and
        transmit, to the UE and via the relay, one of a master information block or radio resource control signaling, the one of the master information block or the radio resource control signaling indicating a first association between the first RACH occasion and the relay SSB and a second association between the second RACH occasion and the network node SSB.

10. The apparatus of claim 9, wherein the first RACH occasion that is associated with the relay SSB and the second RACH occasion that is associated with the network node SSB form a double RACH occasion for the UE.

11. The apparatus of claim 9, wherein the one or more processors are further configured to:
    transmit, to the UE and via the relay, signals based at least in part on an amplify-and-forward mode of the relay; or
    receive, from the UE and via the relay, signals based at least in part on the amplify-and-forward mode of the relay.

12. The apparatus of claim 9, wherein the UE is in a connected mode and within a coverage area of the relay, and wherein the UE is not within a coverage area of the network node.

13. The apparatus of claim 9, wherein the one or more processors are further configured to:
receive, from the UE and via the relay, the preamble as part of an initial acquisition, wherein the initial acquisition is based at least in part on the first RACH occasion and the second RACH occasion.

14. The apparatus of claim 9, wherein the one or more processors are further configured to:
transmit, to the relay, an indication that assigns multiple RACH occasions and SSB slots for use in a coverage area of the relay.

15. The apparatus of claim 9, wherein the first association is based at least in part on communications within a building and the second association is based at least in part on communications outside the building.

16. A method of wireless communication performed by a relay, comprising:
receiving, from a network node and via a network node beam, a network node synchronization signal block (SSB);
transmitting, to a user equipment (UE) and via a relay beam, a relay SSB that is based at least in part on the network node SSB;
receiving, from the UE and via the relay beam, a preamble during a first random access channel (RACH) occasion that is associated with the relay SSB;
transmitting, to the network node and via the network node beam, the preamble during a second RACH occasion that is associated with the network node SSB; and
transmitting, to the UE, one of a master information block or radio resource control signaling, the one of the master information block or the radio resource control signaling indicating a first association between the first RACH occasion and the relay SSB and a second association between the second RACH occasion and the network node SSB.

17. The method of claim 16, wherein the first RACH occasion that is associated with the relay SSB and the second RACH occasion that is associated with the network node SSB form a double RACH occasion for the UE.

18. The method of claim 16, further comprising:
transmitting signals received from the network node to the UE based at least in part on an amplify-and-forward mode of the relay; or
transmitting signals received from the UE to the network node based at least in part on the amplify-and-forward mode of the relay.

19. The method of claim 16, wherein the UE is in a connected mode and within a coverage area of the relay, and wherein the UE is not within a coverage area of the network node.

20. The method of claim 16, further comprising:
assisting the UE in performing an initial acquisition, wherein the preamble is received by the relay and from the UE as part of the initial acquisition, and wherein the initial acquisition is based at least in part on the first RACH occasion and the second RACH occasion.

21. The method of claim 16, further comprising:
transmitting, to the UE, a sidelink message for establishing an association between the UE and the relay beam.

22. The method of claim 16, further comprising:
receiving, from the network node, an indication that assigns multiple RACH occasions and SSB slots for use in a coverage area of the relay.

23. The method of claim 16, wherein the first association is based at least in part on communications within a building and the second association is based at least in part on communications outside the building.

24. A method of wireless communication performed by a network node, comprising:
transmitting, to a relay and via a network node beam, a network node synchronization signal block (SSB), wherein a relay SSB is derived based at least in part on the network node SSB and is transmitted to a user equipment (UE) via a relay beam;
receiving, from the relay and via the network node beam, a preamble during a second random access channel (RACH) occasion that is associated with the network node SSB, wherein the preamble is received by the relay via the relay beam during a first RACH occasion that is associated with the relay SSB; and
transmitting, to the UE and via the relay, one of a master information block or radio resource control signaling, the one of the master information block or the radio resource control signaling indicating a first association between the first RACH occasion and the relay SSB and a second association between the second RACH occasion and the network node SSB.

25. The method of claim 24, wherein the first RACH occasion that is associated with the relay SSB and the second RACH occasion that is associated with the network node SSB form a double RACH occasion for the UE.

26. The method of claim 24, further comprising:
transmitting, to the UE and via the relay, signals based at least in part on an amplify-and-forward mode of the relay; or
receiving, from the UE and via the relay, signals based at least in part on the amplify-and-forward mode of the relay.

27. The method of claim 24, wherein the UE is in a connected mode and within a coverage area of the relay, and wherein the UE is not within a coverage area of the network node.

28. The method of claim 24, further comprising:
receiving, from the UE and via the relay, the preamble as part of an initial acquisition, wherein the initial acquisition is based at least in part on the first RACH occasion and the second RACH occasion.

29. The method of claim 24, further comprising:
transmitting, to the relay, an indication that assigns multiple RACH occasions and SSB slots for use in a coverage area of the relay.

30. The method of claim 24, wherein the first association is based at least in part on communications within a building and the second association is based at least in part on communications outside the building.

* * * * *